United States Patent [19]
Heinz

[11] 3,732,724
[45] May 15, 1973

[54] OPERATIONAL VISCOSIMETER

[76] Inventor: Werner Heinz, 72 Dabringhauserstrasse, Cologne-Dellbruck, Germany

[22] Filed: Feb. 1, 1971

[21] Appl. No.: 113,879

[52] U.S. Cl. .................................. 73/59, 73/169
[51] Int. Cl. .................................. G01n 11/10
[58] Field of Search ............................ 73/59, 60, 169

[56] References Cited

UNITED STATES PATENTS

| | | | |
|---|---|---|---|
| 2,683,984 | 7/1954 | Boyle et al. | 73/59 |
| 1,321,736 | 11/1919 | Green | 73/59 |
| 2,738,670 | 3/1956 | Coene | 73/60 |

Primary Examiner—Louis R. Prince
Assistant Examiner—Joseph W. Roskos
Attorney—Burns, Doane, Swecker & Mathis

[57] ABSTRACT

A viscosimeter of the type employed for measuring the viscosity of dough, semi-liquid artificial resins, paints, lubricating oils and lacquers is disclosed. The viscosimeter includes a chamber capable of being sealed to retain fluid under pressure. A drive shaft extends through an opening in one wall of the chamber. The shaft is bent at an acute angle at a distance spaced inwardly from the wall of the chamber. A tubular extension connects the shaft with a ball or paddle, or other measuring surface, which is rotated by the shaft. A flexible sleeve of substantially the same diameter as the tube extends between the end of the tube and the interior surface of the wall surrounding the shaft, thereby forming an effective rotary seal.

3 Claims, 2 Drawing Figures

OPERATIONAL VISCOSIMETER

BACKGROUND OF THE INVENTION

The present invention relates to an operational viscosimeter which is adapted to be installed in pipe lines or reaction vessels and in which the viscosity of the substance is measured by means of a torque exerted by the substance on rotating measuring surfaces.

An operational viscosimeter of this type is employed for measuring the viscosity of dough, semi-liquid artificial resins, lubricating oils, paints and lacquers.

In one known embodiment of such operational viscosimeter the frictionless transmission of the rotational movement of the measuring surface from the reaction vessel which may be pressurized to the outside is effected by means of a magnetic coupling. The disadvantage of such arrangement is that only relatively small torques can be transmitted so that difficulties arise if substances of high viscosity are measured. Further, the exchange of the substance in the narrow gap between the magnetic surfaces occurs only very slowly so that rapid changes of viscosity cannot be determined correctly.

In another known embodiment of such a viscosimeter the measuring surface is mounted on a hollow shaft which extends into the reaction vessel and the torsion of said shaft resulting from the torque which depends on viscosity is measured by electronic means. In view of the required stability the hollow shaft must be very rigid so that it is responsive only to very high viscosities. Moreover, the electronic torque measuring means must be very sensitive. Therefore, such viscosimeter is expensive and unreliable.

SUMMARY OF THE INVENTION

It is an object of the present invention to provide an operational viscosimeter in which the rotational movement of the measuring surface by which the torque is measured is transmitted from the reaction vessel to the outside essentially without friction and avoids the disadvantages of the above-mentioned known embodiments. The invention is based on the one hand on the knowledge that a measuring surface as, for example, a stirring paddle, performs a rotational movement about a separate imaginary axis also if the paddle is caused to make two linear reciprocating movements displaced 90° in time and space relative to each other. As is well known, the circular movement of any object may be resolved into two linear components displaced 90° in time and space relative to each other. The present invention is based on the other hand on the knowledge that a resilient hollow body such as a hose comprising resilient material, a corrugated metal hose or a similar element may serve as a low friction sealing element between elements performing relative linear movement which elements extend from the interior of a pressurized experiment chamber to the outside thereof.

According to the present invention one embodiment comprises a measuring surface mounted on a rod, said rod being enclosed by a hose forming a sealing element, and said rod is caused to make two linear movements offset relative to each other for 90° in timely and spatial respect so that the rod moves along the periphery of a cylinder. This may be effected by any suitable drive mechanism. The rod and the measuring surface extend into the pressurized reaction vessel or measuring chamber. The hose seals the reaction vessel against the outside. The measuring surface performs a rotational movement about an imaginary axis. The torque to be produced by the drive mechanism is proportional to the viscosity and may be measured by known means. The inherent friction of this arrangement is only caused by the natural friction of the hose. It is particularly small if a corrugated metal hose is used as sealing element.

A further embodiment according to the invention comprises a shaft which is curved or cranked once or twice within the measuring chamber. The shaft is enclosed from all sides (that means also at the end) by a tube forming a sealing element. The end of the shaft which is within the measuring chamber may rotate relative to the inner surface of the hose. The front end of the hose which is within the measuring chamber is closed. The measuring surface is fastened to this end of the hose. Outside of the measuring chamber the shaft extends in a linear direction and is driven by a drive element. The end of the hose which is within the measuring chamber and the measuring surface perform a rotational movement about an imaginary axis which in this case coincides with the axis of the linear portion of the shaft. The torque dependent on the viscosity may also be measured at this linear portion of the shaft.

The pressure within the measuring chamber tends to compress the hose which must be avoided. To this end the end of the shaft within the measuring chamber is provided with bearings, namely ball bearings or plain bearings, the outer diameter of said bearings corresponding to the inner diameter of the hose. This provides for a circular cross-section of the hose even under high pressures. Further, this prevents contact of the shaft with the hose during the rotational movement which might result in increased friction.

According to the invention it is also contemplated to provide bar-shaped or shaft-shaped elements transmitting a circular or elliptical rotational movement to a measuring surface by superposing two linear movements displaced in timely and spatial respect whereby it is made possible to use an essentially hose-like resilient structure as sealing element for the support. The advantage of the circular movement relative to the elliptical movement is that the torque which is dependent on the viscosity is kept constant if the viscosity remains constant.

Another embodiment of the invention contemplates imparting a rotational movement to the viscous substance by means of a rotary surface which is driven from the outside and extends into the measuring chamber. This rotary surface comprises for example a hollow cylinder or a stirring paddle. Further a measuring surface is provided which is arranged in one of the above-described manners. The rotating substance then tends to entrain the measuring surface due to its viscous resistance to flow so that a torque dependent on the viscosity results which torque may be measured. In this version, the hose-like sealing element of the measuring surface support is deformed only for a certain angle by actuation of the viscosimeter or by variations of the viscosity. The shaft of the rotary surface may be sealed for example by a stuffing box since in this embodiment friction losses do not affect the measuring result.

The above-described embodiments of the invention include a stirring paddle type measuring surface or a rotary symmetrical body. In such case the flow produced in the substance by the rotational movement is not planar shear flow and cannot be determined in mathematical respect for non-Newtonian substances. Therefore, as further improvement of the invention it is suggested to fasten a plate or a disc to provide the measuring surface in such a manner to the end of the shaft or bar that the perpendicular of the surface extends essentially parallel to the shaft or bar. A second plate is fixedly arranged parallel to the first plate in spaced relation thereto. The substance between the two plates is then subjected to an essentially planar shear flow which may be calculated. It is suitable to provide at least one of the two parallel plates with openings so that a good substance exchange may be effected in the space between the two plates. To obtain a greater torque it is also possible to provide several pairs of plates instead of the one pair of plates.

DESCRIPTION OF THE DRAWINGS

These preferred embodiments are illustrated in the accompanying drawings in which.

DESCRIPTION OF THE PREFERRED EMBODIMENTS

Figure 1:
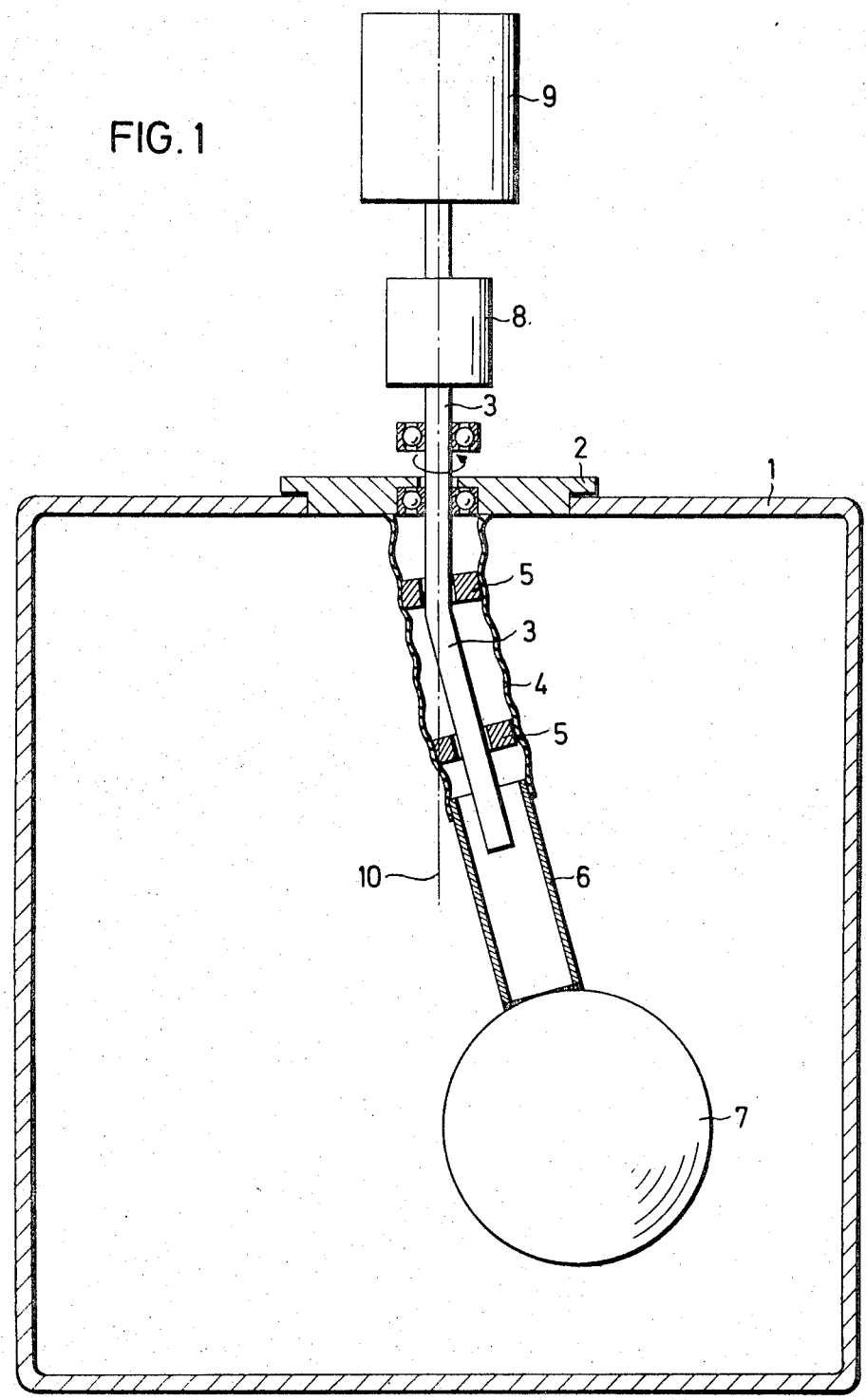
FIG. 1 is a cross-sectional view of a viscosimeter in accordance with one preferred embodiment.

FIG. 1 shows a reaction vessel 1 with the base plate 2 of the viscosimeter attached thereto. The shaft 3 comprises a curved portion inside of the reaction vessel or measuring chamber 1 and a linear portion outside of the same. In the interior of the reaction vessel 1 the shaft 3 is encompassed by a pressure-tight corrugated metal hose 4 which is connected to the base plate 2 in a rigid and pressure-tight manner. Annular bearings 5 of Teflon journal the corrugated hose 4 and rotate on the shaft 3 during the rotational movement. The corrugated hose 4 is extended by a conventional rigid tube 6 which terminates in a ball 7 serving as a stirring body. The shaft 3 is driven by engine 9 through torque indicator 8. Thus the ball 7 moves along a circular path in the substance to be measured, the center of the circular path being indicated by line 10. The corrugated hose 4 does not rotate, but flexes laterally to accommodate rotation of the shaft 3. The flexing of the hose may be resolved into its movement along orthogonal axes to show that the hose moves back and forth along the respective axes from each other. The inherent friction of the apparatus is limited to the friction of the annular bearings 5 on the shaft 3. Due to the use of Teflon, this friction is very small. Axial forces resulting from the pressure in the experiment chamber do not deform the corrugated hose 4 since same is very rigid in axial direction. The torque measured by the torque indicator 8 is proportional to the viscosity of the substance. The law of Stokes serves as a base for the mathematical connection of torque and viscosity.

Figure 2:
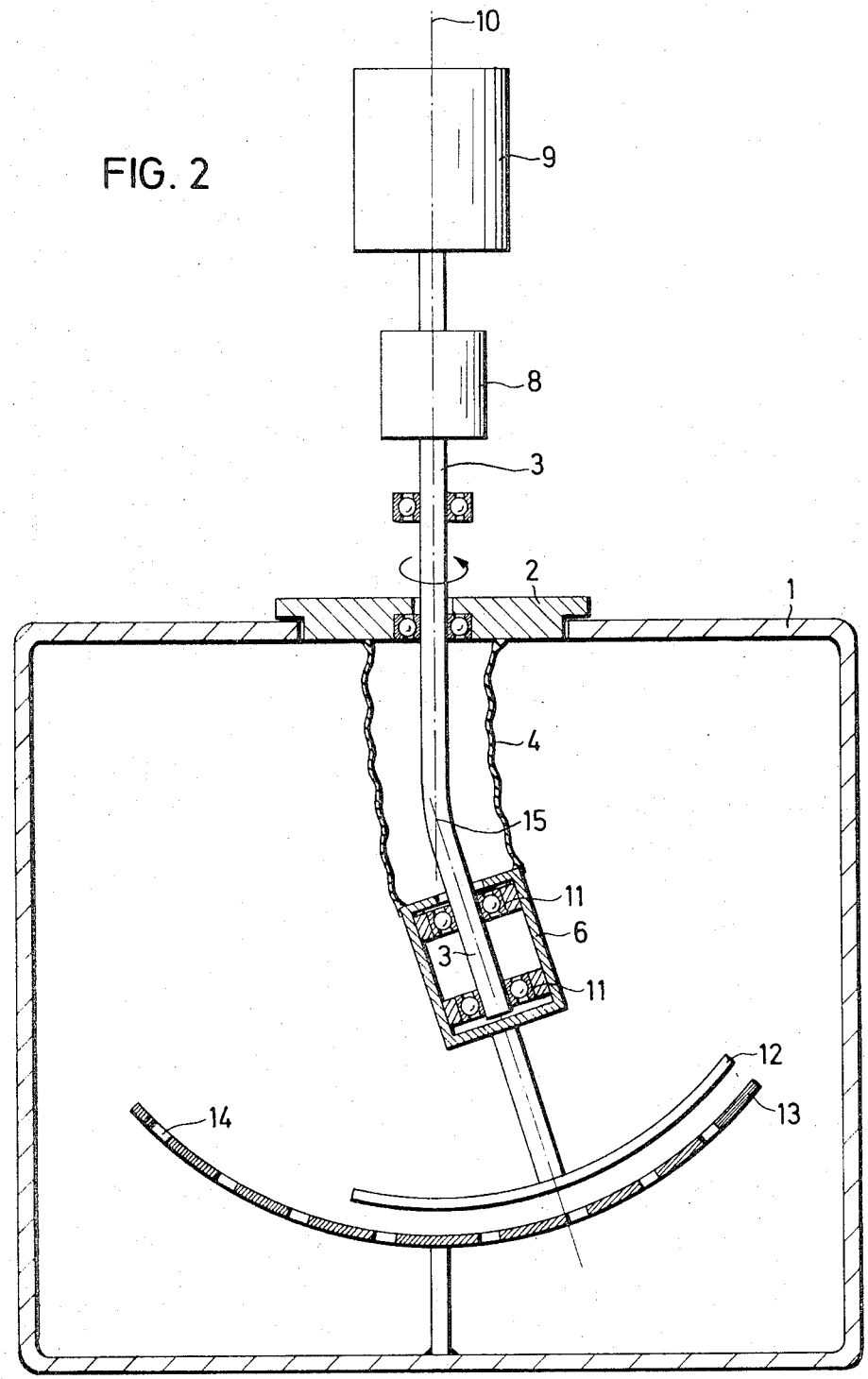
FIG. 2 is a cross-sectional view of a viscosimeter incorporating another preferred embodiment of this invention.

The embodiment of FIG. 2 includes a shaft 3 supported by two ball bearings 11. The outer rings of the two bearings engage the inner wall of tube 6. In this case the measuring surface 12 comprises a curved plate. The center of curvature of this surface is defined by the point of intersection 15 between its perpendicular and the center line 10. The plate performs a rotational movement about the center line 10.

A second larger and curved plate 13 provided with openings 14 is stationary and spaced a small distance from plate 12. Upon rotation of shaft 3, the substance between plates 12 and 13 is subjected to a shear flow which allows an exact calculation also with non-Newtonian substances. The torque measured by torque indicator 8 is directly proportional to the viscosity of the substance.

What I claim is:

1. A viscosimeter comprising chamber means having a wall, a rotary shaft extending through said wall, bearing means on said wall supporting such shaft for rotation about an axis, a portion of said shaft in said chamber means being inclined relative to said axis, measuring surface means mounted on said shaft at a greater distance from said wall than said inclined portion is spaced from said wall, and seal means extending between said wall and said measuring surface means, said seal means including a flexible hollow body secured to the interior of said wall around said shaft, said seal means also including a rigid tube surrounding said shaft, said flexible hollow body being secured to said rigid tube and extending continuously between said rigid tube and said wall, said body and said tube having substantially the same external diameter, whereby the interior of said chamber means may be pressurized without causing leakage of fluid around said shaft.

2. A viscosimeter according to claim 1 including bearing means within said hollow body allowing rotation of said shaft relative to said hollow body.

3. A viscosimeter according to claim 1 including bearing means within said rigid tube allowing rotation of said shaft relative to said rigid tube.

* * * * *